United States Patent
Onishi et al.

(10) Patent No.: US 10,410,375 B2
(45) Date of Patent: Sep. 10, 2019

(54) IMAGE PROCESSING APPARATUS, IMAGE PROCESSING METHOD, AND A NON-TRANSITORY COMPUTER READABLE MEDIUM

(71) Applicant: JAPAN AGENCY FOR MARINE-EARTH SCIENCE AND TECHNOLOGY, Kanagawa (JP)

(72) Inventors: Ryo Onishi, Kanagawa (JP); Shintaro Kawahara, Kanagawa (JP); Keiko Takahashi, Kanagawa (JP)

(73) Assignee: JAPAN AGENCY FOR MARINE-EARTH SCIENCE AND TECHNOLOGY, Kanagawa (JP)

( * ) Notice: Subject to any disclaimer, the term of this patent is extended or adjusted under 35 U.S.C. 154(b) by 98 days.

(21) Appl. No.: 15/526,354

(22) PCT Filed: Nov. 12, 2015

(86) PCT No.: PCT/JP2015/081857
§ 371 (c)(1),
(2) Date: May 12, 2017

(87) PCT Pub. No.: WO2016/076394
PCT Pub. Date: May 19, 2016

(65) Prior Publication Data
US 2017/0316583 A1    Nov. 2, 2017

(30) Foreign Application Priority Data

Nov. 14, 2014    (JP) ................. 2014-232222

(51) Int. Cl.
*G06K 9/00* (2006.01)
*G06K 9/36* (2006.01)
(Continued)

(52) U.S. Cl.
CPC ................. *G06T 7/90* (2017.01); *G01W 1/00* (2013.01); *G06T 13/60* (2013.01); *G06T 2207/10024* (2013.01); *G06T 2207/30192* (2013.01)

(58) Field of Classification Search
USPC ........... 382/162, 276; 702/3; 703/2; 345/426
See application file for complete search history.

(56) References Cited

U.S. PATENT DOCUMENTS

2006/0100784 A1* 5/2006 Wang ..................... G01W 1/00
                                                                702/3
2006/0176303 A1* 8/2006 Fairclough .............. G06T 15/50
                                                                345/426
(Continued)

FOREIGN PATENT DOCUMENTS

JP    06-231277    8/1994
JP    08-190639    7/1996
(Continued)

OTHER PUBLICATIONS

International Preliminary Report on Patentability and Written Opinion in International Application No. PCT/JP2015/081857 dated May 16, 2017, 7 pages.

(Continued)

*Primary Examiner* — Kathleen Y Dulaney
(74) *Attorney, Agent, or Firm* — Marshall, Gerstein & Borun LLP

(57) ABSTRACT

An image processing apparatus comprising: a storage device storing weather data representing a state of an atmospheric air in at least one of a plurality of areas existing within a predetermined range; and a control device computing a color of a cloud about at least one area by using the weather data.

6 Claims, 9 Drawing Sheets

(51) Int. Cl.
　　　*G06T 15/50*　　(2011.01)
　　　*G06F 7/60*　　(2006.01)
　　　*G01W 1/00*　　(2006.01)
　　　*G06T 7/90*　　(2017.01)
　　　*G06T 13/60*　　(2011.01)

(56) References Cited

U.S. PATENT DOCUMENTS

2010/0305916 A1* 12/2010 Takahashi .............. G01W 1/10
　　　　　　　　　　　　　　　　　　　　　703/2
2012/0055244 A1* 3/2012 Dolce .................. G01J 1/0271
　　　　　　　　　　　　　　　　　　　　　73/170.27

FOREIGN PATENT DOCUMENTS

| JP | 11-053576 | 2/1999 |
|---|---|---|
| JP | 2001-202527 | 7/2001 |
| JP | 2013-054005 | 3/2013 |
| WO | WO-98/26306 A1 | 6/1998 |
| WO | WO-2009/057190 A1 | 5/2009 |

OTHER PUBLICATIONS

Miyazaki et al., "Visual Simulation of Cumulus Clouds Using Fluid Dynamics and Adaptive Texture Synthesis", Visual Computing/ Graphics and CAD Joint Symposium 2006, Yokoshu, Jun. 22, 2006, pp. 65-70.

Yamada, "Basics of Numerical Weather Prediction and Outline of Operational Numerical Weather Prediction Models at the Japan Meteorological Agency", Smart Grid, Jul. 15, 2014, vol. 4, No. 3, pp. 19-23.

Kawahara, "Visualization of Geoenvironmental Data Using Google Earth", Journal of the Visualization Society of Japan, Oct. 1, 2014, vol. 34, No. 135, pp. 22-27.

Iwabuchi et al., "Photorealistic Visualization of Clouds Simulated by Using Cloud-Resolving Meteorological Model", Journal of the Visualization Society of Japan, Jul. 1, 2008, vol. 28, No. 110, pp. 2-7.

Search Report in International Application No. PCT/JP2015/081857 dated Dec. 22, 2015, 4 pages.

Extended European Search Report for corresponding European Application No. 15858505.9, dated Jun. 6, 2018.

Office Action, Japanese Patent Application No. 2014-232222, dated Jul. 3, 2018. (Machine Translation).

Haase H et al., "Meteorology meets computer graphics—a look at a wide range of weather visualisations for diverse audiences" Computer & Graphics Elsevier, GB, vol. 24, No. 3, Jun. 1, 2000, pp. 391-397.

\* cited by examiner

IMAGE PROCESSING APPARATUS, IMAGE PROCESSING METHOD, AND A NON-TRANSITORY COMPUTER READABLE MEDIUM

TECHNICAL FIELD

The present invention pertains to an image processing apparatus, an image processing method and a non-transitory computer readable medium.

BACKGROUND ART

With an improvement of performance of a computer instanced by a supercomputer, a quantity of weather data obtained by a weather simulation incredibly increases as compared with those hitherto given. However, visualization of results of the weather simulation is not yet greatly progressed. For example, a weather forecast on a TV and other equivalent systems still provides merely two-dimensionally generated images captured when looking down at the earth's surface from the sky.

DOCUMENTS OF PRIOR ARTS

Patent Documents

[Patent Document 1] Japanese Patent Application Laid-Open Publication No. 2001-202527
[Patent Document 2] Japanese Patent Application Laid-Open Publication No. H8-190639
[Patent Document 3] Japanese Patent Application Laid-Open Publication No. 2013-54005
[Patent Document 4] Japanese Patent Application Laid-Open Publication No. H6-231277
[Patent Document 5] Japanese Patent Application Laid-Open Publication No. H11-53576

SUMMARY OF THE INVENTION

Technical Problem

The conventional visualization of the cloud is performed targeting at reflected (scattered) light of the sunlight (short waves) from clouds by looking down at the ground from the sky as in the case of photos taken from a weather satellite. Therefore, any problem does not arise by setting a cloud color in white.

New visualization of the cloud involves rendering the cloud by looking up at the sky from the ground as the case may be. However, when the cloud color is set in white similarly to the case of looking down from the sky, a feeling of strangeness is caused in the visualized image of the cloud in some cases. Even when looking down at the ground from the sky and when setting the cloud color in white as the cloud is viewed, e.g., obliquely from upward, the feeling of strangeness is also caused in the visualized image of the cloud as the case may be. It is therefore required to determine the cloud color corresponding to a state of the weather in the visualization of the weather data on the occasion of looking up at the sky.

A technology of the disclosure of the present application aims at providing an image processing apparatus capable of generating an image containing a cloud having a color corresponding to a state of the atmospheric air.

Solution to Problem

The technology of the disclosure adopts the following means in order to solve the problems described above. To be specific, a first aspect is an image processing apparatus including: a storage device to store weather data representing a state of an atmospheric air in at least one of a plurality of areas existing within a predetermined range; and a control device to compute a color of a cloud about at least one area by using the weather data. According to the first aspect, the control device computes the color of the cloud, based on the cloud color computed about at least one area by using the weather data. The cloud color is computed based on the weather data, thereby enabling generation of the image containing the cloud having the color corresponding to the state of the weather. According to the first aspect, the storage device may store the weather data representing the states of the atmospheric air of two or more areas in the plurality of areas. In this case, the cloud color in each area may be computed based on the weather data of the corresponding area, and may also be computed based on the weather data of two or more areas including the corresponding area.

A second aspect is the image processing apparatus, in which the control device computes the color of the cloud in at least one area of the remaining areas, based on the cloud color computed about at least one area. According to the second aspect, the cloud colors in the plurality of areas can be computed based on the weather data of one area. A computation quantity and a storage capacity can be thereby reduced.

A third aspect is the image processing apparatus, in which the control device computes the color of the cloud in at least one area being an area to which a viewpoint position of the image belongs when generating the image containing the cloud.

A fourth aspect is the image processing apparatus, in which the control device computes a color of a shadow of the cloud and non-transparency in at least one area by using the weather data.

A fifth aspect is the image processing apparatus, in which the weather data include a downward short wave radiant quantity.

A sixth aspect is the image processing apparatus, in which the control apparatus generates an image by synthesizing a photo image containing an earth's surface or structures on the earth's surface within the predetermined range with an image of the cloud having the computed color.

The aspect of the disclosure may be accomplished such that an information processing apparatus runs a program. In other words, a configuration of the disclosure can be specified as a program for causing the information processing apparatus to execute processes to be executed by respective means according to the aspects described above, or as a non-transitory computer readable recording medium recorded with the program. The configuration of the disclosure may also be specified as a method by which the information processing apparatus executes the processes to be executed by the respective means. The configuration of the disclosure may further be specified as a system including the information processing apparatus that executes the processes to be executed by the respective means.

Advantageous Effects of Invention

According to the technology of the disclosure, it is feasible to provide the image processing apparatus capable of generating the image containing the cloud having the color corresponding to the state of the atmospheric air.

EMBODIMENTS

An embodiment will hereinafter be described with reference to the drawings. A configuration of the embodiment is an exemplification, and a configuration of the disclosure is not limited to the specific configuration of the embodiment of the disclosure. On the occasion of embodying the configuration of the disclosure, a specific configuration corresponding to the embodiment may also be properly adopted.

Generally, a color of clouds is blackish gray when the sky is shadowed by thick clouds, and is whitish gray when the sky is clear but with some clouds. This is because the color of the clouds is influenced by transmission of sunlight in addition to a reflection (scattering) of the sunlight when looking up at the sky from the ground. Therefore, the color of the clouds is not always white but is different depending on a state of the sky.

The color of the clouds can be arithmetically determined based on physical laws with fidelity about the reflection and the transmission of the sunlight, in which case, however, a computation quantity becomes tremendous, with the result that the arithmetic determination of the color of the clouds is not realistic.

An image processing apparatus according to the embodiment is an apparatus configured to compute weather data at a certain point of time by weather simulation based on the weather data and topographical data as initial conditions, and to generate an image of the sky including the clouds being looked up from the ground and other equivalent positions at the time concerned on the basis of the computed weather data. Herein, the topographical data are data representing a topographical configuration and other equivalent topographical elements of earth's surface. The weather data are data representing states of an atmospheric air and other equivalent weather elements.

(Example of Configuration)

Figure 1:
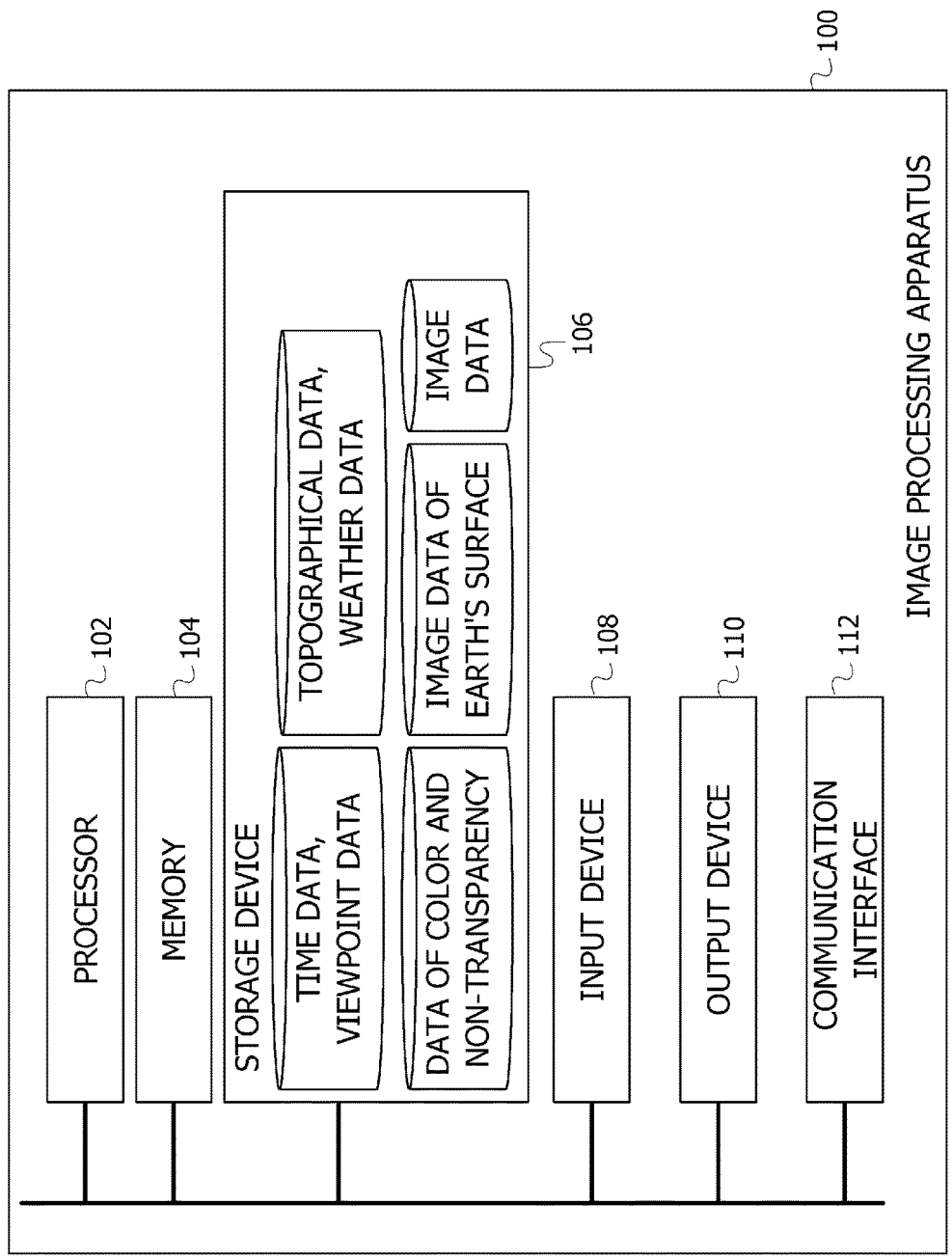
FIG. 1 is a diagram illustrating an example of a hardware configuration of an image processing apparatus.

FIG. 1 is a diagram illustrating an example of a configuration of the image processing apparatus according to the embodiment. An image processing apparatus 100 illustrated in FIG. 1 has a configuration of a general type of computer (an information processing apparatus). The image processing apparatus 100 in FIG. 1 includes a processor 102, a memory 104, a storage device 106, an input device 108, an output device 110, and a communication interface 112. These components are interconnected via a bus. The memory 104 and the storage device 106 are non-transitory computer readable recording mediums. The hardware configuration of the information processing apparatus is not limited to the example illustrated in FIG. 1, and the components may be properly omitted, replaced and added.

The image processing apparatus 100 can be attained by using a dedicated or general-purpose computer instanced by a PC (Personal Computer), a workstation (WS, Work Station), a mobile phone, and a car navigation system, or an electronic equipment mounted with the computer.

The processor 102 loads programs stored on the recording medium onto a work area of the memory 104 and runs the programs, and respective component units are controlled through running the programs, whereby the information processing apparatus 100 can attain functions matching with predetermined purposes.

The processor 102 is, e.g., a CPU (Central Processing Unit) and a DSP (Digital Signal Processor). The processor 102 may include a GPU (Graphical Processing Unit). The processor 102 executes the weather simulation for computing the states and other equivalent elements of the atmospheric air from the topographical data and the weather data. The weather simulation will be described later on. The processor 102 computes image data to be displayed on the output device 110 from a result of the weather simulation. The processor 102 is one example of a "control device".

The memory 104 includes, e.g., a RAM (Random Access Memory) and a ROM (Read Only Memory). The memory 104 is also called a main storage device.

The storage device 106 is exemplified by an EPROM (Erasable Programmable ROM), a Hard Disk Drive (HDD) and a Solid State Drive (SSD). The storage device 106 can include a removable medium, i.e., a portable recording medium. The removable medium is, e.g., a USB (Universal Serial Bus) memory, or a disc recording medium instanced by a CD (Compact Disc) and a DVD (Digital Versatile Disc). The storage device 106 is also called a secondary storage device.

The storage device 106 stores a various categories of programs, various items of data and various types of tables used for performing at least the weather simulation and image processing. The storage device 106 stores Operating System (OS), the various categories of programs, the various items of data and other equivalent software. The information to be stored in the storage device 106 may also be stored in the memory 104. The information to be stored in the memory 104 may also be stored in the storage device 106. The various items of data and other equivalent software may also be received from external devices via the communication interface 112.

The storage device 106 stores time data and viewpoint data that are inputted by a user and other equivalent persons, the topographical data and the weather data as the initial conditions, and the weather data as the result of the weather simulation. The storage device 106 stores color data and non-transparency data that are generated based on the weather data, the image data of the earth's surface, structures instanced by buildings and backgrounds that are used when rendering, and three-dimensional coordinates of the earth's surface. The image data of the earth's surface, the structures instanced by the buildings are photo image data obtained by capturing images of, e.g., the real earth's surface. The earth's surface may be defined as combinations of the earth's surface and the structures instanced by the buildings without being distinguished therebetween. The structures instanced by the buildings are the structures existing on the earth's surface. The storage device 106 stores the image data including polygon data, texture data and other equivalent data, which are generated based on the colors, the non-transparency and other equivalent elements.

The input device 108 includes a keyboard, pointing device, a wireless remote controller, a touch panel and other equivalent devices. The input device 108 can include a video-image input device like a camera and a voice input device like a microphone. The input device 108 accepts inputs of visualization target positions, the topographical data and the weather data from the user.

The output device 110 includes a display device instanced by a CRT (Cathode Ray Tube) display, a LCD (Liquid Crystal Display), a PDP (Plasma Display Panel) and an EL (Electroluminescence) panel, and an output device instanced by a printer. The output device 110 can include a voice output device like a loudspeaker.

The output device 110 displays the images, based on the image data computed by the processor 102. The output device 110 may cause an external display device of the image processing apparatus 100 to display the images. The output device 110 may also transmit the image data to an external information processing apparatus of the image processing apparatus 100, and may cause the display device of this external information processing apparatus to display the images of the image data.

The communication interface 112 connects to other apparatuses, and controls communications between the information processing apparatus 100 and other apparatuses. The communication interface 112 is exemplified by a LAN (Local Area Network) interface board, a wireless communication circuit for wireless communications, and a communication circuit for telephone communications. The LAN interface board and the wireless communication circuit are connected to a network instanced by the Internet.

The processor 102 loads programs stored in the storage device 106 onto the memory 104 and runs the programs, whereby the image processing apparatus 100 attains respective operations to be described later on.

Steps to write the program include, as a matter of course, processes that are executed in time-series along a written sequence, and processes that are executed in parallel or individually without being necessarily processed in time-series. Part of the steps to write the program may be omitted. A series of processes can be executed hardwarewise and softwarewise as well. Hardware components are hardware circuits, which are exemplified by an FPGA (Field Programmable Gate Array), an ASIC (Application Specific Integrated Circuit), a gate array, a combination of logic gates, and an analog circuit. The hardware is one example of a "control device".

(Weather Simulation)

The weather simulation involves computing, based on a weather model, items of weather data instanced by a pressure, a density and a wind speed, a thermal radiation, a cloud distribution, a downward short wave radiant quantity and other equivalent items of data of the atmospheric air in a predetermined spatial range for a predetermined period from the topographical data and the weather data. The cloud distribution includes a cloud water quantity, a rainfall sewage quantity, a cloud ice quantity, a snowfall quantity, and a hail quantity.

The topographical data includes, e.g., positions and geological features and other equivalent data of the earth's surface within the spatial range as a target of the weather simulation. The geological features represent attributes (features of the grounds instanced by bare grounds, lawns and paved surfaces) of the earth's surface. The geological features exert influence on emissivities on the earth's surface. The emissivity is one of the attributes of the earth's surface. The emissivity of the earth's surface differs depending on a difference between the geological features.

The weather simulation include positions, winds (wind directions, wind speeds and other equivalent wind data), temperatures, air pressures, humidities, water vapour contents, quantities of solar radiations from the sun at a whole or part of spots within a weather simulation target spatial range.

The positions within the weather simulation target spatial range may be given by any type of coordinate system exemplified by an orthogonal coordinate system and a polar coordinate system.

The weather simulation involves segmenting the weather simulation target spatial range into a plurality of grids (regions) each having a predetermined size. The grid takes a shape of, e.g., cuboid. Each grid has a bottom face parallel with a horizontal plane, and side faces parallel with a north-south direction and an east-west direction. A size of one grid is 500 m in the north-south direction, 500 m in the east-west direction and 200 m in a heightwise direction. The size of the grid used in the weather model may change depending on the position. The size of the grid is determined by taking, e.g., a computation load and other equivalent factors into consideration.

Figure 2:
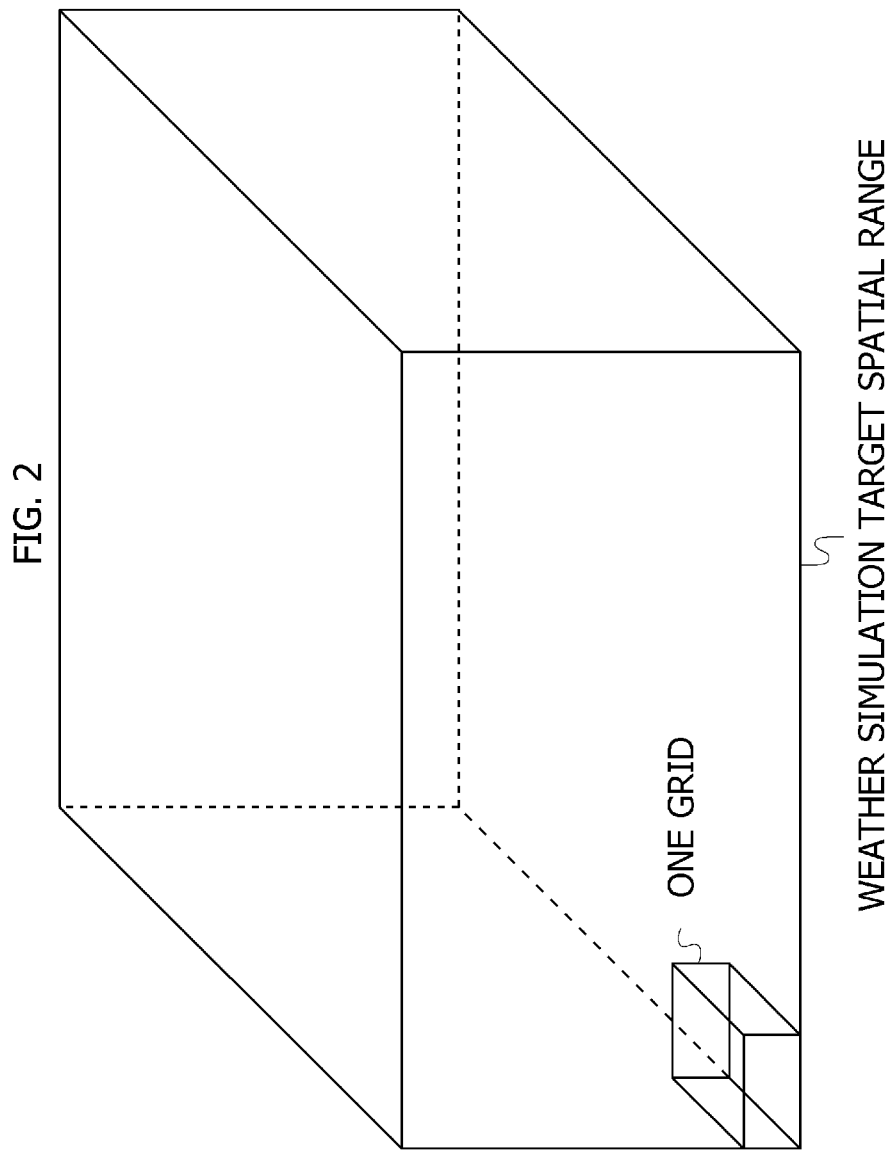
FIG. 2 is a view illustrating an example of a weather simulation target spatial range and a grid.

FIG. 2 is a view illustrating an example of the weather simulation target spatial range and the grid. In the example of FIG. 2, the cuboidal grid exists in the cuboidal spatial range as the weather simulation target. The weather simulation target spatial range and the grid may also take shapes other than the cuboids.

For example, a nonhydrostatics/atmospheric general circulation model (MSSG-A: Atmospheric component of the Multi-Scale Simulator for the Geoenvironment) is used as the weather model for the weather simulation. The weather model may, without being limited to this model, involve using any type of weather model.

In the nonhydrostatics/atmospheric general circulation model, when giving the topographical data and the weather data of the wind, the temperature, the humidity, the pressure and other equivalent data items at a certain point of time as the initial conditions, the weather data of the wind, the temperature, the humidity, the pressure and other equivalent data items based on the topographical data are computed per grid. In the nonhydrostatics/atmospheric general circulation model, the items of weather data instanced by the cloud water quantity, the rainfall sewage quantity, the cloud ice quantity, the snowfall quantity, the hail quantity, the downward short wave radiant quantity and other equivalent items of data of the atmospheric air are computed per grid based on those items of weather data described above. These items of weather data are data representing states of the atmospheric air. In the nonhydrostatics/atmospheric general circulation model, the weather data after an elapse of a minute period of time are computed per grid based on these items of weather data. Herein, the downward short wave radiant quantity is defined as an energy of short waves that are radiated downward from a lower face of the grid. The short wave is an electromagnetic wave having a wavelength that is equal to or smaller than 4 μm. The downward short wave radiant quantity may also be computed by adding computed results of downward radiant quantities of plural wavelength bands that are equal to or smaller than 4 μm but are not overlapped. The downward radiant quantities of only visible light regions may also be used as the downward short wave radiant quantity. The cloud water quantity, the cloud ice quantity and the downward short wave radiant quantity of the weather data are examples of the weather data used when rendering the clouds.

(Operational Example)

Figure 3:
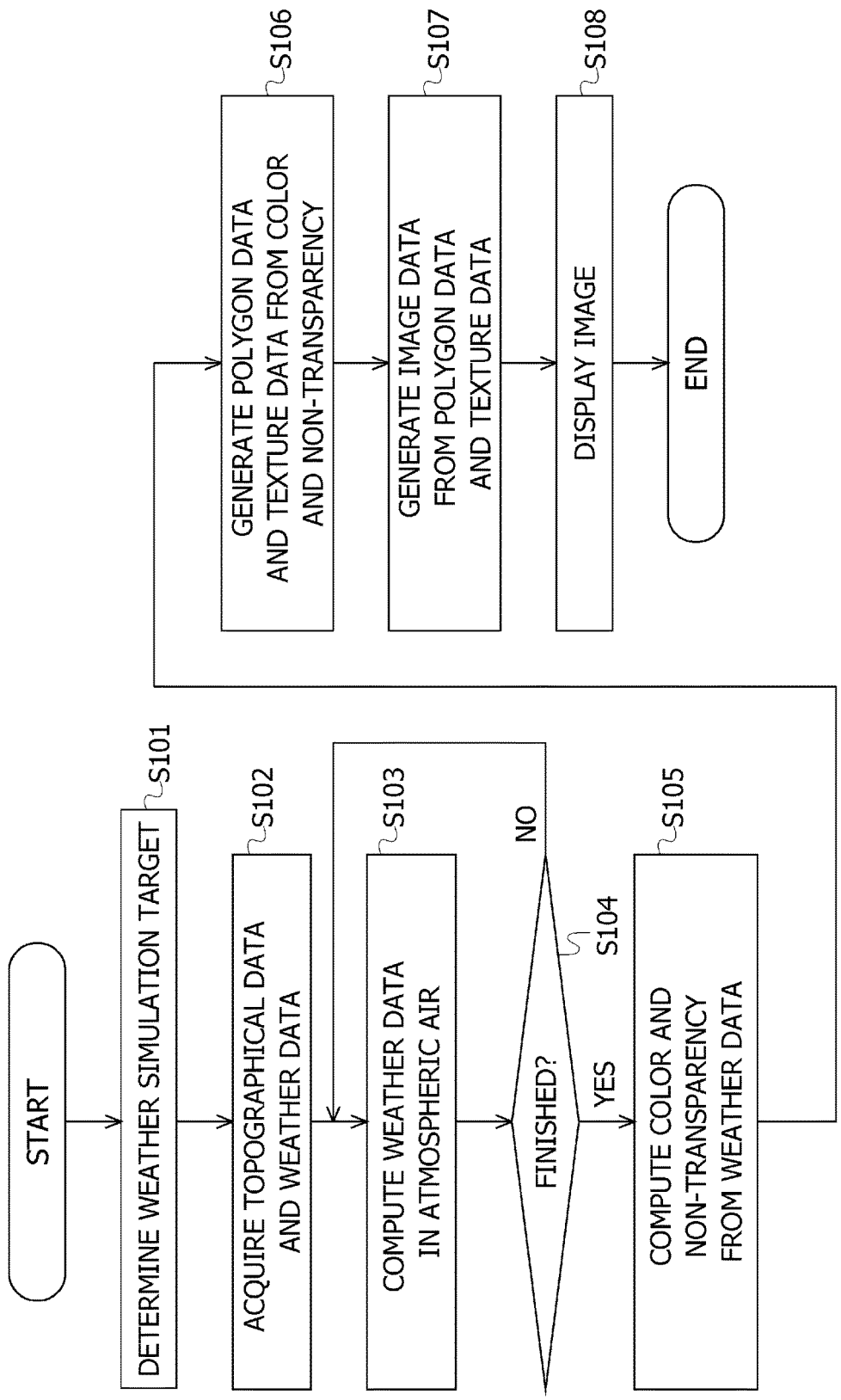
FIG. 3 is a flowchart illustrating an example of an operation flow of an image processing apparatus.

An operational example of the image processing apparatus 100 will be described. The processor 102 of the image processing apparatus 100 computes the items of weather data in the predetermined range for the predetermined period by the weather simulation through running the programs, and generates images containing the clouds in the sky as viewed from the earth's surface, the clouds in the sky as viewed from between the earth's surface and the clouds, and shadows of the clouds over the earth's surface in a visualization target range for a visualization target period from the items of weather data. FIG. 3 is a flowchart illustrating an example of an operation flow of the image processing apparatus.

In step S101, the processor 102 of the image processing apparatus 100 determines the weather simulation target spatial range and period. The user or another equivalent person inputs, to the image processing apparatus 100, time data and viewpoint data for visualizing results of the weather simulation from the input device 108. The time data are data of simulation time in the weather simulation. The time concerned may also be a period having a time width. The viewpoint data contain, e.g., coordinates of viewpoints (viewpoint positions), directions of lines of sights (visual lines), ranges to be displayed, sizes of the images, view angles and other equivalent items of the images for visualizing the weather simulation. The view angles are an angle in a horizontal direction and an angle in a perpendicular direction of the spatial range expressed in the images. The coordinates of the viewpoints are exemplified by coordinates about the earth's surface, the sky between the earth's surface and the cloud, and the sky above the cloud. The spatial range expressed in the images for visualizing the weather simulation is determined based on the viewpoint data. The time of the time data and the viewpoint positions of the visual line data are inputted by being associated with each other. In other words, the user or another equivalent person makes inputs for visualizing the designated viewpoint positions at the designated time. The time data and the viewpoint data may be designated so that the viewpoint positions change corresponding to consecutive points of time. A plurality of viewpoint positions may also be designate with respect to one point of time. The inputted time data and the inputted visual line data are stored in the storage device 106. The spatial range expressed in the images to be visualized is determined based on the viewpoint position, the direction of the visual line, the range to be displayed, the size of the image, the view angle and other equivalent elements. The spatial range is one example of a "predetermined range".

The processor 102 determines, e.g., a range that is 10 km in length in each of the north, south, east and west directions and 20 km in height from the viewpoint position designated by the visual line data as the weather simulation target spatial range. The processor 102 determines a period up to the time designated by the time data associated with the visual line data as the weather simulation target period. The plurality of viewpoint positions exists, in which case the processor 102 determines the weather simulation target spatial range and the weather simulation target period for each of these viewpoint positions.

A broader weather simulation target spatial range may also be set as the weather simulation target spatial range. The height of the weather simulation target spatial range is determined based on criteria of an air existing range, a cloud existing range and other equivalent ranges. The weather simulation target spatial range may also be determined by taking account of the viewpoint position, the direction of the visual line and other equivalent elements. The weather simulation target spatial range may further be determined based on a criterion of a distance at which the cloud is visually recognizable from the viewpoint position.

Figure 4:
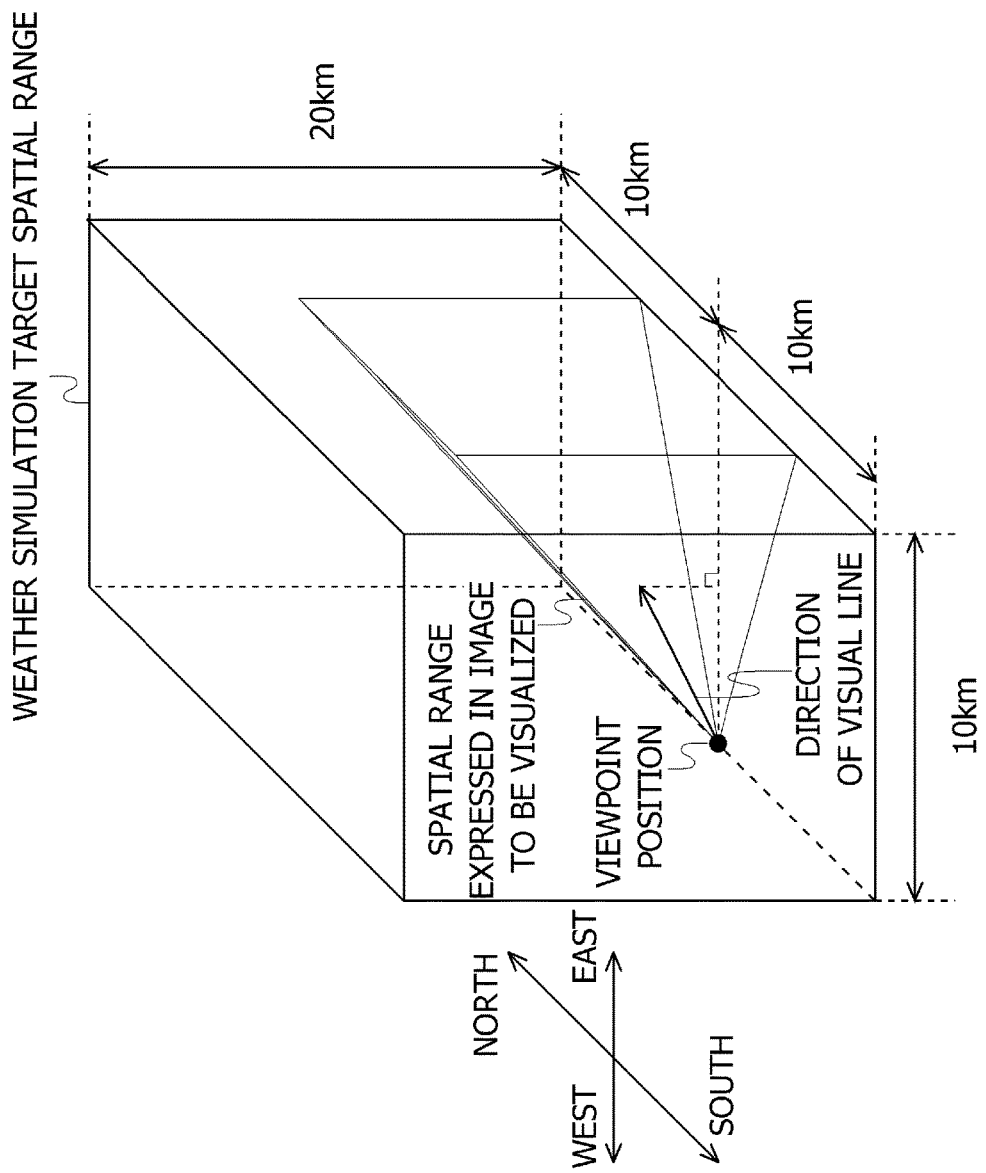
FIG. 4 is a view illustrating an example of a viewpoint position and the weather simulation target spatial range.

FIG. 4 is a view illustrating an example of the viewpoint position and the weather simulation target spatial range. In the example of FIG. 4, only a side in the direction of the visual line is set as the weather simulation target spatial range. To be specific, herein, as in FIG. 4, when the visual line is directed to the east, a range, which is 20 km in length in the north-south direction from the viewpoint being centered, 10 km in length toward the east from the viewpoint and 20 km in height, is to be set as the weather simulation target spatial range. The processor 102 sets a range encompassing the spatial range expressed in the images to be visualized as the weather simulation target spatial range.

In step S102, the processor 102 of the image processing apparatus 100 acquires the topographical data and the weather data, at the predetermined time (notated by ts), of the weather simulation target spatial range (area). The acquired topographical data and weather data are stored in the memory 104 or the storage device 106. The topographical data and the weather data acquired herein are the input data (initial conditions) used for performing the weather simulation. The weather simulation target period is a period up to the time designated by the time data from the predetermined time (ts). The topographical data and the weather data may be inputted from the input device 108 and stored in the storage device 106, and may also be received from the external apparatus via the communication Interface 112 and stored in the storage device 106. When the plurality of visualization target viewpoint positions exists, the topographical data and the weather data, at the predetermined time (ts), of the weather simulation target spatial range are acquired for each of these viewpoint positions.

The processor 102 substitutes "ts" into the time "t". The time "t" is used for the weather simulation. In the weather simulation, the items of weather data in the weather simulation target spatial range for the weather simulation target period are computed, in which the initial conditions are the weather data and the topographical data when the time t=ts.

In step S103, the processor 102 of the image processing apparatus 100 performs the weather simulation by using the topographical data and the weather data at the time "t", which are acquired based on the weather model in step S102. The weather simulation involve computing the weather data in the weather simulation target spatial range after an elapse (t+Δt) of minute time Δt from the time "t". The processor 102 computes the weather data per grid. The computed weather data are stored in the storage device 106 as the weather data at the time (t+Δt).

In step S104, the processor 102 determines whether the weather simulation is finished with respect to the weather simulation target period. The image processing apparatus 100 is previously given the weather simulation target period. The processor 102 determines whether the weather simulation is finished with respect to the weather simulation target period. When finished (S104; YES), the processing advances to step S105. Whereas when not finished (S104; NO), the processor 102 substitutes (t+Δt) into the time "t". Thereafter, the processing loops back to step S103.

The plurality of visualization target viewpoint positions exists, in which case the processes in step S103 and step S104 are executed with respect to the weather simulation target spatial range and the weather simulation target period about each of these viewpoint positions.

In step S105, the processor 102 computes the color and the non-transparency per grid with respect to the atmosphere and the ground from the weather data per grid, which are computed in the weather simulation. The computed color and non-transparency per grid are stored in the storage device 106. The processor 102 computes the color and the non-transparency per grid with respect to the weather simulation target period. The colors and the non-transparency per grid may also be computed together with the weather data of the cloud water quantity and other equivalent items on the occasion of computing the weather data in the weather simulation in step S103. The colors and the non-transparencies in the atmospheric air correspond to the clouds in the atmospheric air.

Herein, a non-transparency P is expressed as below as a function of a cloud water quantity rqc [kg/m$^3$] and a cloud ice quantity rqi [kg/m$^3$] per grid of the weather data. The non-transparency P has a relation "P=1−T" with the non-transparency P. The non-transparency P indicates a degree of non-transparency, in which "1" represents the non-transparency, and "0" represents the transparency.

[Mathematical Expression 1]

$$x = rpc + a \times rqi \quad (1)$$

$$P = \begin{cases} 0 & x \leq x_{min} \\ P_{MAX} \times \dfrac{x - x_{min}}{x_{MAX} - x_{min}} & x_{min} < x \leq x_{MAX} \\ P_{MAX} & x_{MAX} < x \end{cases}$$

Herein, x is an effective scattered cloud quantity (kg/m$^3$). The effective scattered cloud quantity x indicates a degree of having influence on the non-transparency of the cloud. The degree of scattering the radiation of the short waves (solar radiation) differs depending on the cloud water and the cloud ice. A coefficient a indicates a degree of the scattering by the cloud ice, based on a criterion of the scattering by the cloud water. The coefficient a is, e.g., 0.1. For example, values of $P_{MAX}$ and $x_{min}$, $x_{MAX}$ are given such as: $P_{MAX}$=0.666, $x_{min}$=0 kg/m$^3$, $x_{MAX}$=0.0002 kg/m$^3$. The rainfall sewage quantity, the snowfall quantity and the hail quantity in addition to the cloud water quantity and the cloud ice quantity may be reflected in the effective scattered cloud quantity.

The colors (R (Red), G (Green) and B (Blue)) are expressed as below as functions of the downward short wave radiant quantity S [W/m$^2$] per grid of the weather data. These colors correspond to the colors of the clouds. The color of the cloud of each grid depends on the downward short wave radiant quantity of each grid. The downward short wave radiant quantity of a certain grid is small, which means that a solar radiation quantity of this grid is small. The color of the cloud becomes more blackish as the downward short wave radiant quantity becomes smaller. The color of the cloud becomes more whitish as the downward short wave radiant quantity becomes larger. The colors are herein expressed in RGB and may also be expressed in other color formats instanced by CMY and YUV etc.

[Mathematical Expression 2]

$$R = G = B = \begin{cases} 0 & S \leq 100 \\ 255 \times \dfrac{S - 100}{500} & 100 < S \leq 600 \\ 255 & 600 < S \end{cases} \quad (2)$$

Herein, values of R, G, B are given by 8 bits (0 through 255) but are not limited to 8 bits. The colors may be expressed in any of the following expressions as the functions of the downward short wave radiant quantity S per grid.

[Mathematical Expression 3]

$$R = G = B = \begin{cases} 0 & S \leq 100 \\ 255 \times \dfrac{\log S - \log 100}{\log 600 - \log 100} & 100 < S \leq 600 \\ 255 & 600 < S \end{cases} \quad (3)$$

[Mathematical Expression 4]

$$R = G = B = \begin{cases} 100 & S \leq 100 \\ 100 + 155 \times \dfrac{\log S - \log 100}{\log 600 - \log 100} & 100 < S \leq 600 \\ 255 & 600 < S \end{cases} \quad (4)$$

The processor 102 computes the color and the non-transparency corresponding to the shadow of the cloud over the earth's surface from the weather data computed in the weather simulation. The color and the non-transparency corresponding to the shadow of the cloud over the earth's surface are expressed as below as the functions of the downward short wave radiant quantity S of each spot of the earth's surface of the weather data. The shadow of the cloud over the earth's surface becomes darker as the downward short wave radiant quantity becomes smaller.

[Mathematical Expression 5]

$$R = G = B = \begin{cases} 100 & S \leq 100 \\ 100 + 155 \times \dfrac{\log S - \log 100}{\log 600 - \log 100} & 100 < S \leq 600 \\ 255 & 600 < S \end{cases} \quad (5)$$

[Mathematical Expression 6]

$$P = \begin{cases} P_{MAX} & S \leq 100 \\ P_{MAX} \times \left(1 - \dfrac{\log S - \log 100}{\log 600 - \log 100}\right) & 100 < S \leq 600 \\ 0 & 600 < S \end{cases} \quad (6)$$

$P_{MAX}$ can take values equal to or larger than 0 but equal to or smaller than 1. $P_{MAX}$ is, e.g., 155/255. The color and the non-transparency corresponding to the shadow of the cloud over the earth's surface are superposed on the image of the earth's surface on the occasion of rendering, whereby the shadow of the cloud is rendered over the earth's surface. The non-transparency and the color corresponding to the cloud in the atmospheric air and the shadow of the cloud over the ground may also be expressed in other expressions.

In step S106, the processor 102 generates the polygon data and the texture data from the color and the non-transparency per grid, the three-dimensional coordinates of the earth's surface and the image of the earth's surface. The polygon data and the texture data are data used to generate the image data for displaying the images on the output device 110. With respect to the visualization target time, the processor 102 generates the image data from the color and the non-transparency per grid, which are calculated in step S105. The images of the earth's surface is the photo image obtained by photographing the earth's surface, in which case the image data of the images are generated by synthesizing the photo images with the clouds.

The processor 102 generates the polygon data and the texture data, based on the items of information of the colors, the non-transparencies and the earth's surface that are generated from the weather data. Herein, the polygon data are generated as slice plane data. The polygon data include three-dimensional coordinates of vertexes of the slice plane, normal line vectors and texture coordinates. The processor 102 generates data of plural sets of slice plane data, based on the colors and the non-transparencies that are generated from the weather data. The slice planes of each set of slice plane data are parallel with each other. A group of plural sets of slice plane data are also referred to as slice plane group data. Plural sets of slice plane group data may also be generated. The texture data are data for mapping the texture to the polygon. The texture data include the information of the color, the transparency (non-transparency) and other equivalent elements per coordinate. With respect to the earth's surface, the color and the non-transparency corresponding to the shadow of the cloud, which are computed in step S105, are superposed on the image of the earth's surface.

In step S107, the image processing apparatus 100 determines the slice plane group data used for generating the image data, based on the viewpoint data to be stored in the storage device 106. The image processing apparatus 100 determines, as the slice plane group data for use, the slice plane group data of the slice planes with the normal line direction being approximately parallel with the direction of the visual line.

The processor 102 converts, based on the viewpoint data, each set of slice plane data of the determined slice plane group data into slice plane data of a two-dimensional coordinate space. Herein, the coordinates of the respective vertexes of each slice plane are converted into two-dimensional screen coordinates indicating positions within a display screen and a Z-value indicating a depth within the display screen. The converted data are stored in the storage device 106. The processor 102 computes the Z-values on the basis of the screen coordinates of the vertexes of the respective slice planes and the Z-values with respect to all the coordinate points within a range encompassed by the respective vertexes within the respective slice planes of the slice plane data of the converted two-dimensional coordinate space. The processor 102 computes color data and transparency data per pixel of each slice plane, based on the texture coordinates of the vertexes of each slice plane and the texture data.

The processor 102 executes a rendering process of generating the image data to be displayed on the screen on the basis of the texture coordinates of the respective vertexes, the texture data and the Z-value per screen coordinate about each slice plane, and stores the image data in the storage device 106. In the rendering process, the colors of the respective coordinates within the screen are expressed by stacking the colors and the non-transparencies of the slice planes existing in the respective directions of the visual lines.

Herein, the processor 102 of the image processing apparatus 100 generates the image data by a slice drawing based rendering method as in steps S106 and S107. The processor 102 may also generate the image data by other rendering methods instanced by a ray marching based rendering method in the way of using the colors and the non-transparencies computed in step S105 without being limited to the slice drawing based rendering method, and may store the image data in the storage device 106.

When the visualization target viewpoint data of the weather simulation are configured at each of the consecutive points of time, the processor 102 generates the image data based on the viewpoint data designated at each point of time on the basis of the weather simulation. The processor 102 may also generate the image data as dynamic images by joining these images in a time sequence. Hereat, the visualization target viewpoint data of the weather simulation may be fixed. A plurality of visualization target viewpoint data of the weather simulation may be designated about one point of time. Hereat, the processor 102 generates, based on results of the weather simulation, the images of the designated viewpoint data about the designated time. The processor 102 may also generate the dynamic images by joining those images, which change in viewpoint position, viewpoint direction and range to be displayed as designated by the viewpoint data. The image processing apparatus 100 is capable of generating the dynamic images of a scenery including a situation of the sky viewed from, e.g., a left-side window of a train till arriving at B station since departing from A station at a predetermined date/time.

In step S108, the output device 110 of the information processing apparatus 100 displays the images on the basis of the image data stored in the storage device 106. The output device 110 may also display the images on an external display device. The output device 110 may transmit the image data to another information processing apparatus via the communication network and other equivalent networks, and may display the images of the image data on a display unit of another information processing apparatus.

The weather simulation may be performed by another apparatus other than the image processing apparatus 100, and the image processing apparatus 100 may receive the weather data as the results of the weather simulation from this another apparatus and may generate the images based on the received weather data.

(Specific Example)

Figure 5:
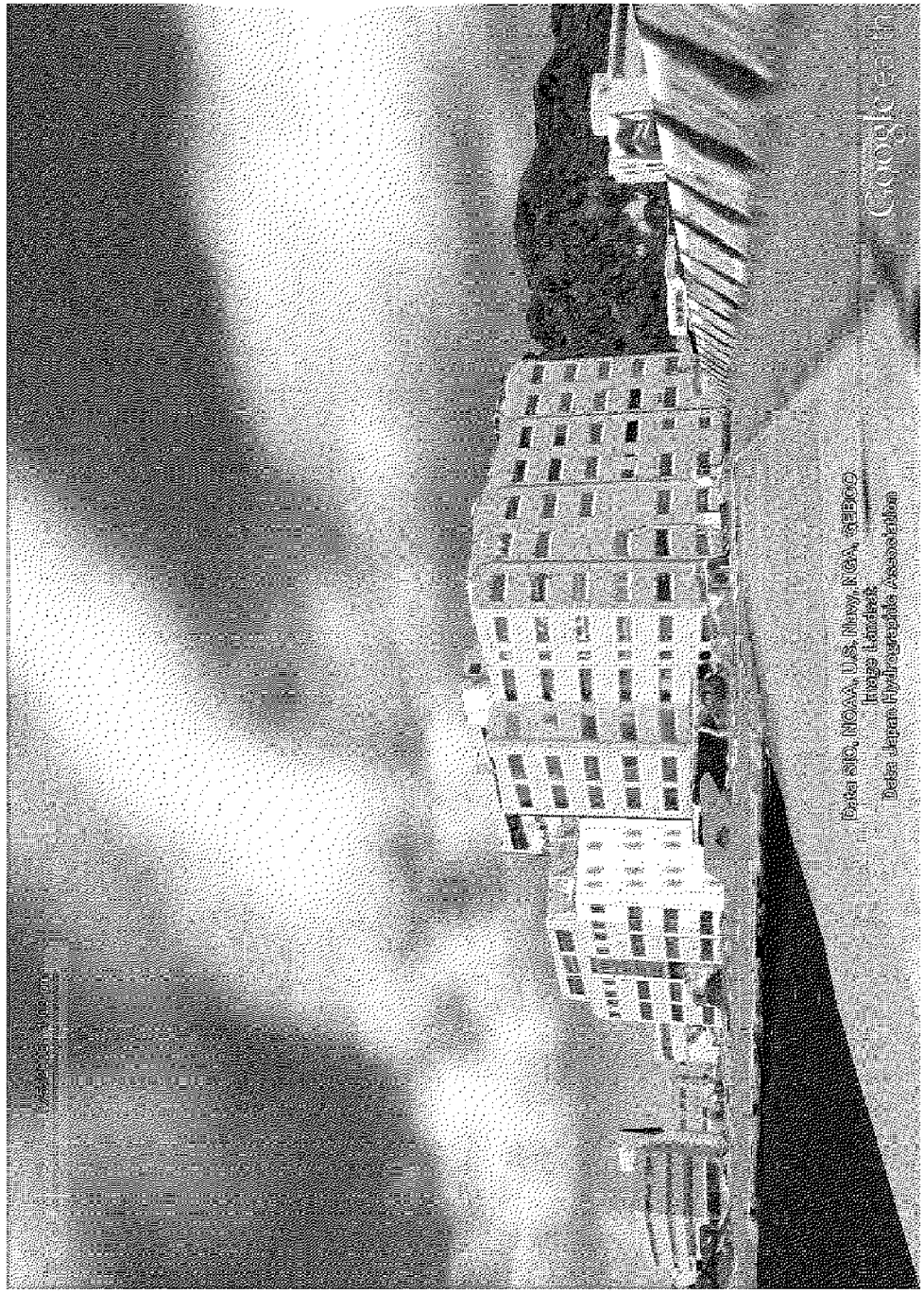
FIG. 5 is a view illustrating a specific example 1-1 of visualization of the weather simulation.
Figure 6:
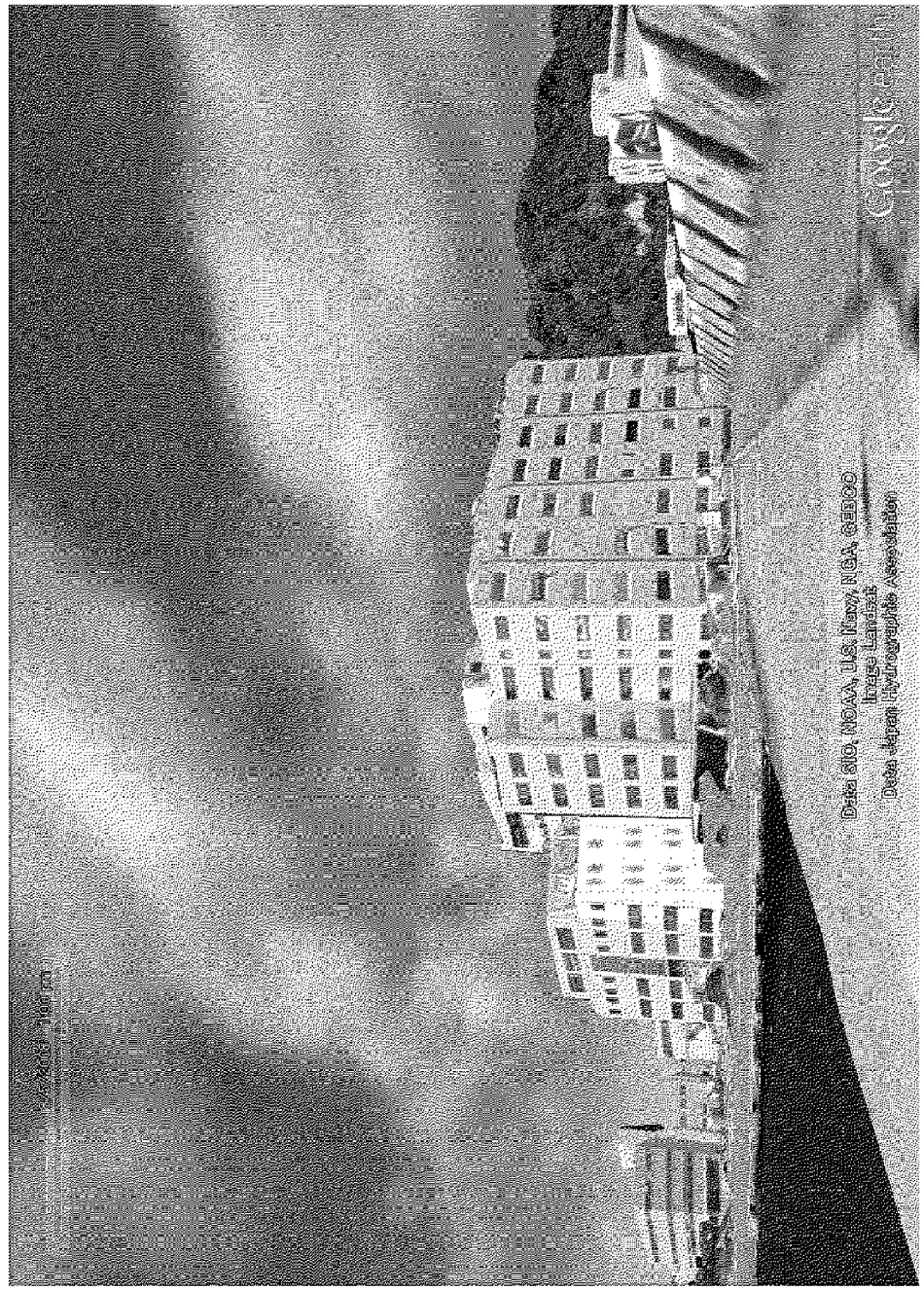
FIG. 6 is a view illustrating a specific example 1-2 of the visualization of the weather simulation.

FIGS. 5 and 6 are views each illustrating a specific example 1 of visualizing the weather simulation. FIGS. 5 and 6 are examples of looking up at the sky from the ground, illustrating the earth's surface and the buildings (structures) in the vicinity of the viewpoint on a lower side of the image and the cloud on an upper side of the image. FIG. 5 is the example in which the color of each grid is white (R=G=B=255) without taking account of the downward short wave radiant quantity on the occasion of rendering the cloud. The cloud is rendered based on the cloud ice quantity and the cloud water quantity. The cloud color is bright even in the case of the thick cloud and the small downward short wave radiant quantity. On the other hand, FIG. 6 is the example of determining, based on the mathematical expression (2), the cloud color of each grid by taking the downward short wave radiant quantity into consideration on the occasion of rendering the cloud. Specifically, the cloud is rendered based on the downward short wave radiant quantity, the cloud ice quantity and the cloud water quantity. The downward short wave radiant quantity is reflected in the cloud color, which becomes darker than in the example of FIG. 5. The example in FIG. 6 conforms to the real cloud color when the downward short wave radiant quantity is small.

(Specific Example 2)

Figure 7:
FIG. 7 is a view illustrating a specific example 2-1 of the visualization of the weather simulation.
Figure 8:
FIG. 8 is a view illustrating a specific example 2-2 of the visualization of the weather simulation.

FIGS. 7 and 8 are views each illustrating a specific example 2 of visualizing the weather simulation. FIGS. 7 and 8 are examples of looking down at the earth's surface and looking up at the cloud from a height between the ground and the cloud, illustrating the earth's surface on the lower side of the image and the cloud in the sky on the upper side of the image. FIG. 7 is the example of not taking account of the downward short wave radiant quantity on the occasion of rendering the earth's surface. The shadow of the cloud is not rendered over the earth's surface. Hence, the brightness of the earth's surface remains unchanged even when the downward short wave radiant quantity is larger or small over the earth's surface. On the other hand, the FIG. 8 is the example of determining, based on the mathematical expressions (5) and (6), a shadow color of the cloud and the non-transparency by taking account of the downward short wave radiant quantity over the earth's surface on the occasion of rendering the earth's surface. For example, the ground in the vicinity of the center of the image in FIG. 8 is darkened by the shadow of the cloud because of the small downward short wave radiant quantity over the earth's surface.

Note that the images in FIGS. 5 through 8 are each rendered by being synthesized with the image of the earth's surface by using the computed cloud, the computed shadow color of the cloud and the computed non-transparency in a way that utilizes software, i.e., Google Earth (trademark) of Google Inc. The image processing apparatus 100 according to the embodiment may generate the image by software other than the Google software.

(Modified Example 1)

In the example described above, the color is determined per grid from the downward short wave radiant quantity per grid, and the colors of all the grids may also be, however, determined based on the downward short wave radiant quantities of the viewpoint positions of the images to be generated by using the relational expressions described above. Hereat, the image processing apparatus 100 may not determine the cloud color per grid, and hence the computation quantity is reduced to a greater degree than the examples described above. The image processing apparatus 100 can determine the cloud color as far as the downward short wave radiant quantity of the viewpoint position is obtained even when not obtaining the downward short wave radiant quantities of all the grids. The downward short wave radiant quantity of the viewpoint position may also be the downward short wave radiant quantity of the grid containing the viewpoint position.

(Modified Example 2)

The processes of the image processing apparatus 100 may be executed in separation by a server apparatus and a client apparatus. The server apparatus and the client apparatus have the same functions as those of the image processing apparatus 100. Explanations of the components common to the examples described above are omitted.

Figure 9:
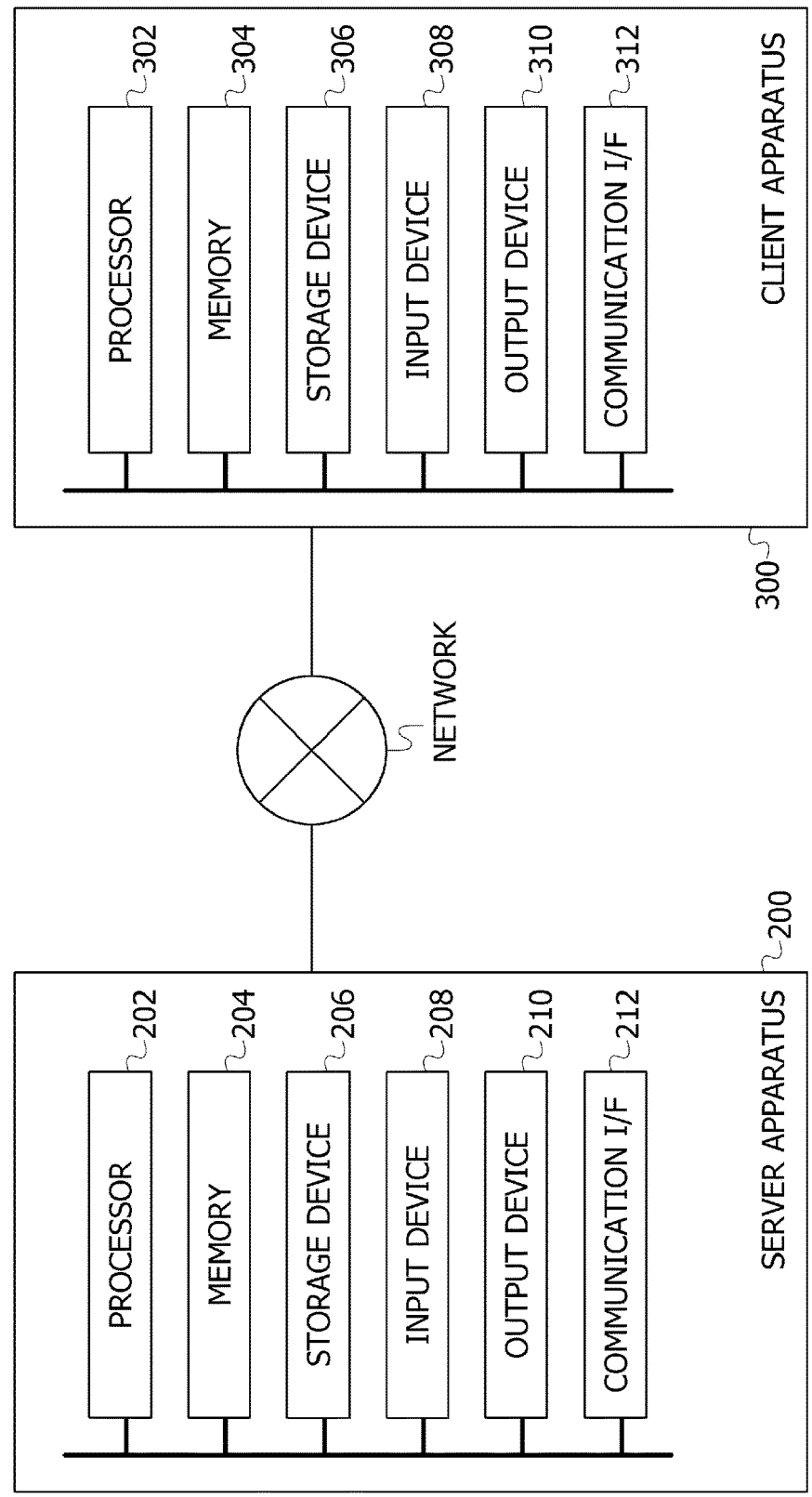
FIG. 9 is a diagram illustrating an example of an image processing system.

FIG. 9 is a diagram illustrating an example of an image processing system according to a modified example. An image processing system 10 in FIG. 8 includes a server apparatus 200 and a client apparatus 300. The server apparatus 200 and the client apparatus 300 are interconnected via a network.

The server apparatus 200 includes a processor 202, a memory 204, a storage device 206, an input device 208, an output device 210, and a communication interface 212. The client apparatus 300 includes the processor 202, the memory 204, the storage device 206, the input device 208, the output device 210, and the communication interface 212.

The client apparatus 300 accepts inputs of the time data and the viewpoint data via an input device 308 from a user of the client apparatus 300. The communication interface 212 of the server apparatus 200 receives the time data and the viewpoint data from a communication interface 312 of the client apparatus 300. The server apparatus 200 computes the cloud color and other equivalent elements from the weather data by performing the weather simulation, based on the data received from the client apparatus 300, in the same way as the image processing apparatus 100 does, thereby generating the image data. The server apparatus 200 transmits the generated image data to the client apparatus 300. The client apparatus 300, upon receiving the image data from the server apparatus 200, displays the image based on the image data on an output device 310.

The server apparatus 200 generates the image data, thereby reducing a computation load on the client apparatus 300. Accordingly, even when the client apparatus 300 is hardware having a small amount of resources, it is feasible to display the results of the weather simulation.

Each of the server apparatus 200 and the client apparatus 300 can be attained by using the dedicated or general-purpose computer instanced by the PC (Personal Computer), the workstation (WS, Work Station), the mobile phone, and the car navigation system, or the electronic equipment mounted with the computer.

(Operation and Effect of Embodiment)

The image processing apparatus 100 computes, based on the topographical data, the weather data and other equivalent data, the weather data by performing the weather simulation with respect to the predetermined spatial range and period. The image processing apparatus 100 computes the cloud and the non-transparency per grid on the basis of the cloud water quantity and the cloud ice quantity per grid of the weather data computed in the weather simulation. The image processing apparatus 100 computes the cloud color based on the downward short wave radiant quantity of the weather data computed in the weather simulation. The image processing apparatus 100 determines the color of the cloud shadow over the earth's surface and the non-transparency on the basis of the downward short wave radiant quantity over the earth's surface of the weather data computed in the weather simulation.

The image processing apparatus 100 can render the cloud and the earth's surface by reflecting the downward short wave radiant quantity. The image processing apparatus 100 can compute the cloud color close to the reality by using the downward short wave radiant quantity at a lower computation cost than by computing the cloud color based on physical laws exemplified by a three-dimensional scattering theory of the light.

The image processing apparatus 100 can generate the images containing the clouds when looking up at the sky so as to match with the actual clouds, based on the weather data given in the weather simulation and other equivalent techniques. The embodiment and modified examples described above can be carried out by being combined with each other to the greatest possible degree.

REFERENCE SIGNS LIST 100 image processing apparatus
102 processor
104 memory
106 storage device
108 input device
110 output device
112 communication interface

What is claimed is:

1. An image processing apparatus comprising:

a storage device storing weather data representing a state of an atmospheric air in at least one of a plurality of areas existing within a predetermined range; and a control device (i) computing a color of a cloud about at least one area by using the weather data, and (ii) generating an image by synthesizing a photo image containing an earth's surface or structures on the earth's surface within the predetermined range with an image of the cloud having the computed color of the cloud, wherein the weather data include an effective scattered cloud quantity which is a sum of (i) a cloud water quantity, and (ii) a cloud ice quantity multiplied by a coefficient that indicates a degree of scattering by cloud ice based on a criterion of scattering by cloud water, and wherein the control device further computes a color of a shadow of the cloud and non-transparency based on the effective scattered cloud quantity in at least one area by using the weather data.

2. The image processing apparatus according to claim 1, wherein the control device computes the color of the cloud in at least one remaining area, based on the cloud color computed about at least one area.

3. The image processing apparatus according to claim 1, wherein the control device computes the color of the cloud in at least one area being an area covering a viewpoint position of the image when generating the image.

4. The image processing apparatus according to claim 1, wherein the weather data include a downward short wave radiant quantity.

5. An image processing method executed by a computer, comprising:

storing weather data representing a state of an atmospheric air in at least one of a plurality of areas existing within a predetermined range, wherein the weather data includes an effective scattered cloud quantity which is a sum of (i) a cloud water quantity, and (ii) a cloud ice quantity multiplied by a coefficient that indicates a degree of scattering by cloud ice based on a criterion of scattering by cloud water;

computing a color of a cloud about at least one area, a color of a shadow of the cloud and non-transparency based on the effective scattered cloud quantity in at least one area by using the weather data; and generating an image by synthesizing a photo image containing an earth's surface or structures on the earth's surface within the predetermined range with an image of the cloud having the computed color of the cloud.

6. A non-transitory computer readable medium recorded with an image processing program to make a computer execute:

storing weather data representing a state of an atmospheric air in at least one of a plurality of areas existing within a predetermined range, wherein the weather data includes an effective scattered cloud quality which is a sum of (i) a cloud water quantity, and (ii) a cloud ice quantity multiplied by a coefficient that indicates a degree of scattering by cloud ice based on a criterion of scattering by cloud water;

computing a color of a cloud about at least one area, a color of a shadow of the cloud and non-transparency based on the effective scattered cloud quantity in at least one area by using the weather data; and generating an image by synthesizing a photo image containing an earth's surface or structures on the earth's surface within the predetermined range with an image of the cloud having the computed color of the cloud.

* * * * *